United States Patent

[11] 3,571,937

| | | |
|---|---|---|
| [72] | Inventor | Howard V. Sears<br>Box 123, Flat River, Mo. 63601 |
| [21] | Appl. No. | 685,671 |
| [22] | Filed | Nov. 24, 1967 |
| [45] | Patented | Mar. 23, 1971 |

[54] METHOD AND APPARATUS FOR DETERMINATION OF ORE SAMPLE LOCATION
6 Claims, 6 Drawing Figs.

[52] U.S. Cl. ............................................. 33/205, 33/1, 33/215
[51] Int. Cl. ............................................. E21b 47/02
[50] Field of Search ............................................. 33/205, 205.5, 205.5 (E), 215.1, 215.2, 204, 206.5, 1 (H), 174 (A), 1 (APT)

[56] References Cited
UNITED STATES PATENTS

| | | | |
|---|---|---|---|
| 2,120,771 | 6/1938 | Thompson | 33/206.5(X) |
| 2,190,779 | 2/1940 | Fogle | 33/1(H) |
| 3,083,469 | 4/1963 | Herbst | 33/206.(5)X |
| 3,344,530 | 10/1967 | Oville | 33/174(A) |
| 3,387,370 | 6/1968 | Brenden et al. | 33/1-(APT) |
| 2,444,265 | 6/1948 | Ostheimer | 33/205 |
| 1,911,997 | 5/1933 | Gillespie | 33/215 |

Primary Examiner—William D. Martin, Jr.
Attorney—Stowell and Stowell

ABSTRACT: A sensing device which defines the terminal position and inclination of a curved prospect hole drilled from a passage in a mine by indicating the distance, slope and deflection, from initial position and azimuth, of progressive points along the hole.

An in-hole sensor is provided with a plurality of potentiometers mounted on mutually perpendicular axes to which are attached pendulums. Angular changes in inclination and attitude of the sensor with reference to the pendulum's vertical position cause related electrical outputs from the potentiometers which can be read as degrees by a readout instrument. Other potentiometers therein have their electrical outputs altered to an extent proportional to the deflection of the hole.

According to the method of the invention cross section samples may be taken from the ground surrounding and in the plane of mine workings by drilling curved prospect holes from within existing mine openings.

PATENTED MAR 23 1971
3,571,937
SHEET 1 OF 3
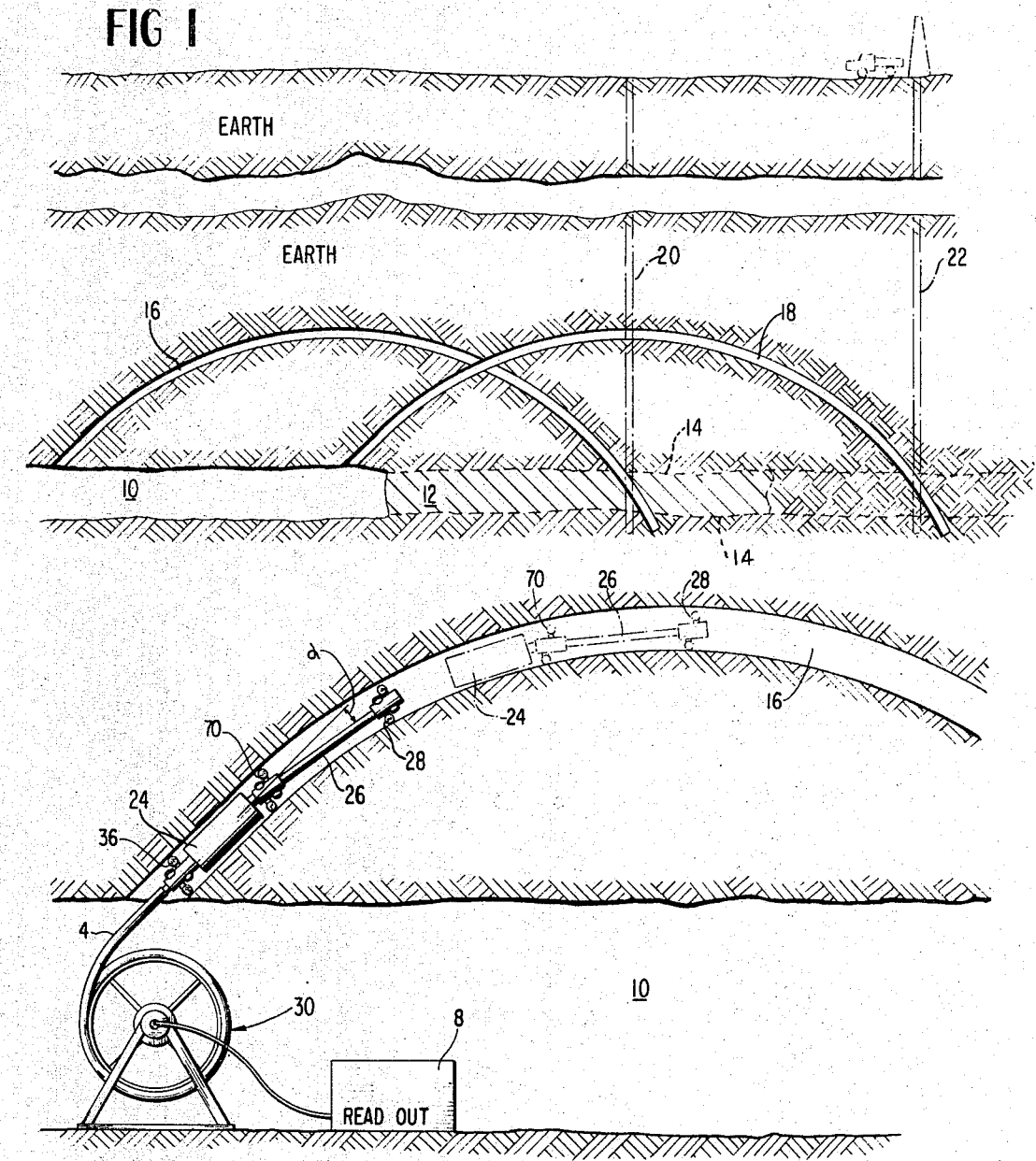
FIG 1
FIG 2
FIG 4
INVENTOR
HOWARD V. SEARS
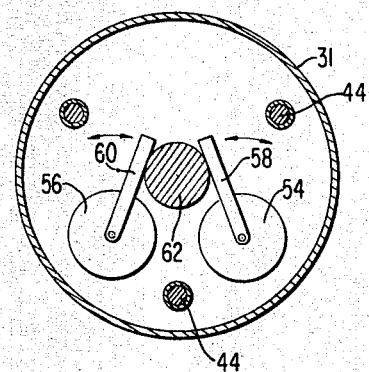
BY
ATTORNEYS

INVENTOR
HOWARD V. SEARS

BY Stowell & Stowell
ATTORNEYS

INVENTOR
HOWARD V. SEARS

METHOD AND APPARATUS FOR DETERMINATION OF ORE SAMPLE LOCATION

BACKGROUND OF THE INVENTION

This invention relates to a sensing device adapted for use in mining and to a method of ore sampling.

In mining, it is often necessary to determine whether a particular ore vein will continue in a certain direction. In the event that a vein should change grade or thickness in a direction relative to an existing mine working, such knowledge is obviously valuable so that any extensions or expansions of the existing mine workings may be made in such a direction to yield the greatest ore recovery.

For example, after ore has been mined and the working has proceeded in a certain direction, it is desired to determine whether a continuation of the mining in this direction would result in still further recovery of ore. In the past, one such method has been the drilling downwardly of prospect holes from the surface of the earth, in line with a projection of the existing mine opening. In this way, samples of earth in the same line with the existing mine level are obtained, analyzed, and the probability for further recovery of ore from the projection determined. However, such a method may sometimes be somewhat cumbersome and expensive, particularly if the mine working is deep within the earth.

SUMMARY OF THE INVENTION

According to the present invention, prospect holes are drilled from the existing mine workings for relatively short distances. By means of known boring techniques, curved prospect holes are drilled and a plurality may radiate out from an end or any desired portion of an existing mine working, all in order to sample the ground surrounding and in the same plane to determine the proper direction for extension or enlargement of the mine workings for further recovery of ore.

An orientation sensing device is employed in practicing this invention and is placed in a prospect hole, the distance and direction from the origin of the prospect hole to its terminus may be determined. Hence, samples may be taken from a curved prospect hole and this invention used to determine the location of the ore samples relative to extant mine workings.

In the drawings:

FIG. 1 is a schematic view of a mine working showing two conventional, vertical prospect holes and also showing two curved prospect holes employed in the practice of this invention.

FIG. 2 is a view similar to FIG. 1, showing the sensing device in initial position and in one progressive position.

FIG. 4 is a view along line 4-4 of FIG. 3.

Figure 3:
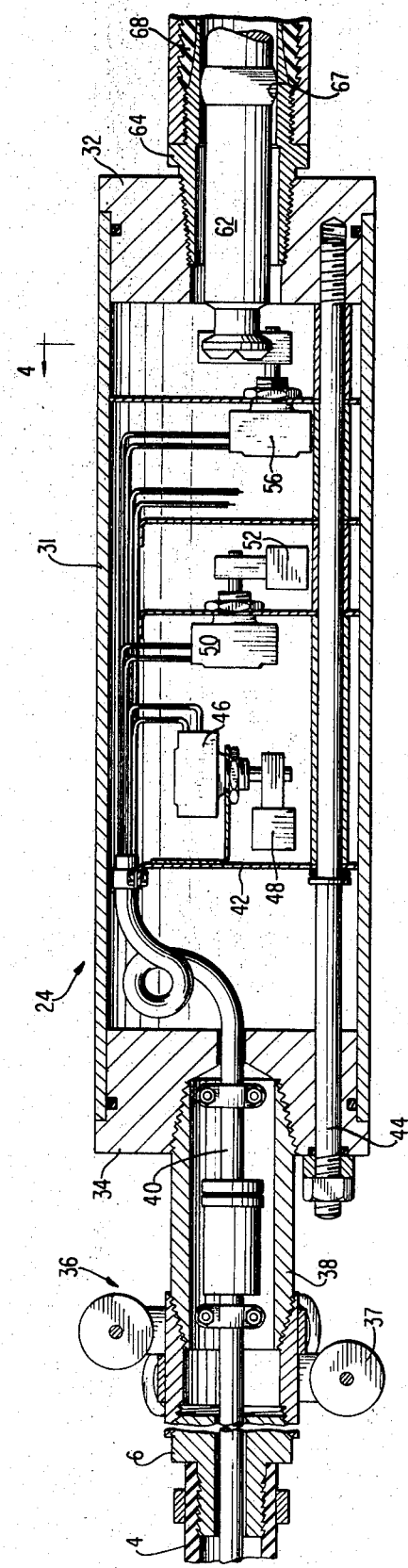
FIG. 3 is a cross-sectional view of the sensing device of this invention.

Turning now to the drawings, FIG. 1 illustrates a mining operation wherein a working 10 is located deep within the earth, and is illustrated as proceeding to the right within an ore vein 12. The area between the dashed lines 14 represents an imaginary extension or projection of the ore. The numerals 16 and 18 denote curved prospect borings in the earth extending from the working 10. It will be observed that the end of prospect bore 16 has intersected a portion of ore vein 12, while the end of prospect bore 18 intersects only the projection of the working 10, the vein 12, for illustrative purposes, having run out.

The numerals 20 and 22 denote vertical prospect holes which would be required according to a prior art practice. It will be observed that the holes 20 and 22 intersect the imagined horizontal projection 14 of the workings 10. According to this prior art practice, ore samples are taken from the holes 20 and 22 in order to determine the extent of the vein 12 in the illustrated direction. It will be apparent that the depth of the sample borings 20 and 22 may be extremely large, particularly as compared with the length of the borings 16 and 18.

Turning now to FIG. 2 of the drawings, the numeral 10 again represents a horizontal portion of mine workings and the number 16 again denotes a curved prospect hole, here illustrated of only limited extent. The number 24 denotes a generally cylindrical sensing device which forms a portion of this invention and is supported at its rearward end by a roller guide 36 and at the other end connected to a rod 26, the ends of the latter being secured to roller probe guides 28 and 70. In general, the diameter of the sensing element 24 and the probe guides 28, 36 and 70 is smaller than the diameter of the prospect hole 16. FIG. 4 denotes a coil of stiffly flexible tubing, disposed on a reel 30 and attached to the sensor roller guide 36 by fitting 6, which is the means by which the sensor is inserted into and withdrawn from the prospect bore.

Figure 8 represents the power source and readout instrument case which may, with 30, be conveniently placed on the floor of the workings 10.

Alpha, the angle of initial deflection of the hole, exists between the longitudinal axis of the sensor housing 24 and the axis of the guided position of the forward probe 26. The dotted position of the sensor assembly is shown to illustrate a position on the progessive survey of the entire prospect hole.

Turning now to FIG. 3 of the drawings, the numeral 31 denotes a cylindrical or tubular element which, together with end plugs 32 and 34, define the shell or casing of sensing element 24. Numeral 36 denotes generally a rear supporting roller guide assembly, including a tubular element 38 preferably threaded into the rear closure cap 34 and provided on its periphery with a plurality of radially extending wheels 37 adapted to engage the walls of the prospect hole and into which is screwed the end fitting 6 of the coil of flexible tubing 30 by means of which the sensor assembly is inserted into and withdrawn from the prospect hole. The numeral 40 denotes a cable carried within flexible tubing 4 and adapted to carry a plurality of electrical wires which lead to the assemblage 30 and convey the electrical output signals from the instruments within 24 presently to be described.

The numeral 42 denotes generally a supporting grid preferably formed of sheet material and positioned within cylinder 31 between ends 32 and 34. A plurality of elongated bolts 44 extend from one plug to the other and pass through the supporting grid assembly 42. A first potentiometer 46 is provided with a weight 48 in the general form of a pendulum and suitably secured to its shaft, all supported by grid 42. It will be observed that tilting the potentiometer 46 will result in a swinging movement of pendulum 48 thereby actuating the rotatable arm of potentiometer 46. The electrical leads from potentiometer 46 are fed to the cable 40.

The numeral 50 denotes a second electrical potentiometer having its corresponding pendulum 52 also secured to its shaft. Again, the electrical leads from potentiometer 50 are carried within cable 40. It will be observed that rolling the sensor axially will result in movement of the pendulum 52 and turning of the shaft of the potentiometer.

Near the right portion of sensor 24 two additional potentiometers 54 and 56 (note also FIG. 4) are carried by the grid support 42. Each of the shafts of these potentiometers is coupled to a lever denoted by 58 for potentiometer 54 and by 60 for potentiometer 56. The end of a deflection shaft 62 is positioned, as best illustrated at FIG. 4, between the levers 58 and 60, the levers being biased to assure continued contact against the end of shaft 62. Again, the electrical leads from the potentiometers 54 and 60 are carried outward through the cable 40.

The numeral 64 denotes a threaded coupling positioned within the central aperture of end plug 32 of the sensor 24. A rubber sleeve 68 is positioned at one of its ends over the sleeve coupling 64 and at its other end is received over a forward guide portion assembly denoted generally by the numeral 70. A plurality of angularly disposed wheels 72 are positioned around the periphery of 70.

Figure 5:
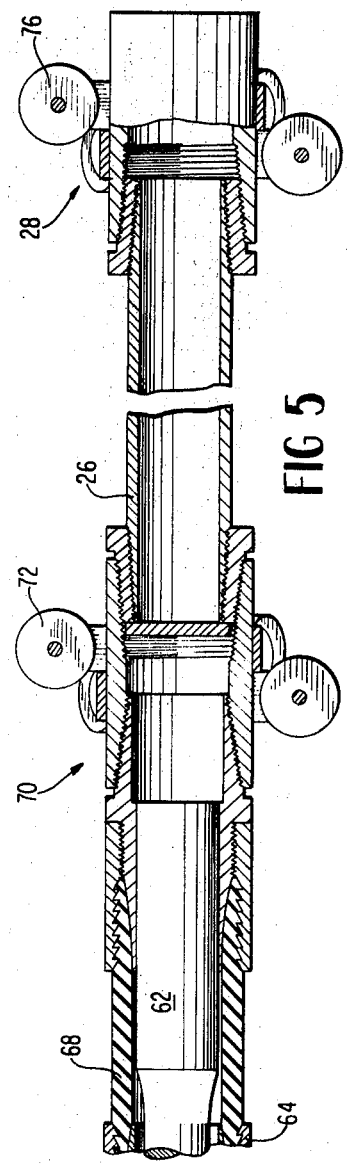
FIG. 5 is a cross-sectional view of a portion of the probe extension of FIG. 3.

The left portion of rod 26 is fastened, as by threading, into the assembly 70 and the right portion extends into a similar assembly which defines the guide 28 of FIG. 3. A plurality of wheels 76 are provided around the periphery of the guide 28 at spaced angular positions. Reference again to FIG. 3 of the drawings discloses the relationship between the elements illustrated in FIGS. 3, 4 and 5. The sensor 24 is rearwardly supported by the assembly 36 and forwardly supported by the assembly 70. With insertion of the sensor assembly of FIG. 3 into the prospect hole 16, the forward guide 28 will follow the curved prospect hole and the angle between rod 26 and the sensing element 24 will indicate the degree of curvature of the hole in the plane of the drawings. As the rod 26 assumes various angular orientations with respect to sensor 24, the shaft 62 will pivot about an enlarged portion 67 on its periphery, with this pivoting motion being transmitted to the end of the rod 62 which rotates the shafts to which the levers 58 and 60 are connected in the two forward potentiometers 54 and 56. It will be apparent that from a knowledge of the distance between assemblies 28 and 70, and the distance between pivot 67 and the end of rod 62 which contacts the two forward potentiometers levers, values of the angle alpha illustrated at FIG. 2 may be computed from changes in the electrical resistance of potentiometers 54 and 56.

While the angle alpha illustrated at FIG. 2 of the drawings lies in the plane of the drawing, the prospect hole 16 may deviate from this plane and such deviation will be apparent in the relationships between the electrical resistivities of the associated potentiometers 50, 54 and 56. The relationship of electrical resistances of the same three potentiometers is employed to deduce the curvature of any tested increment of prospect hole 16. Electrical signals from potentiometer 46 are employed to get the longitudinal inclination of the prospect hole with an accuracy dependent on how near its axis is to horizontal. From this, and knowing the length of cable 40 fed into the bore 16, the location of the very end of the prospect hole 16 may be calculated and accordingly ore samples obtained from the end of the hole may be located relative to existing mine workings. Thus, before continuing a mine working in a certain direction, test borings are made to determine the extent and quality of veins adjacent existing mine workings. One drill which has been found suitable for drilling prospect holes such as 16 is that illustrated in my Pat. No. 3,084,673, although any specific drill may be so employed.

Figure 6:
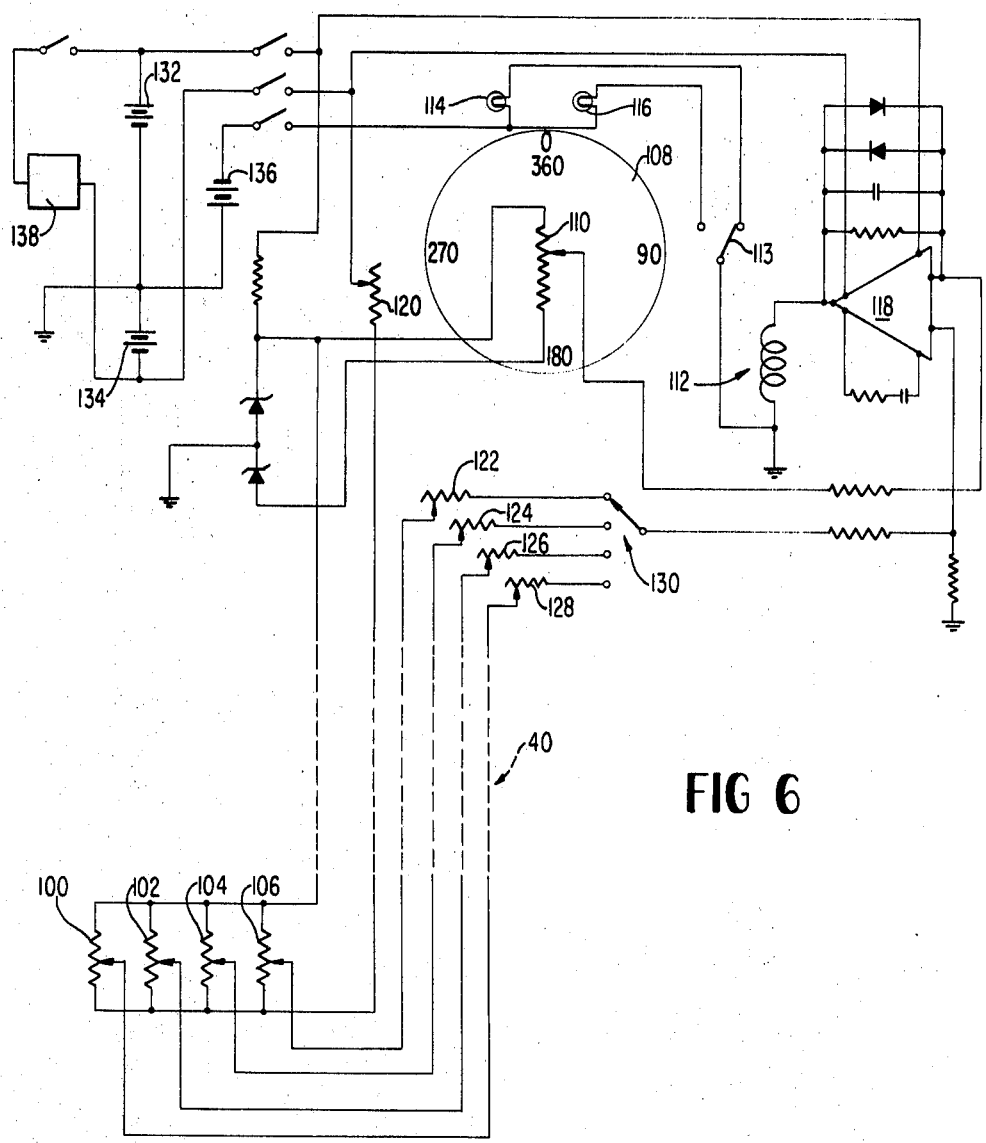
FIG. 6 is a schematic diagram of a null balance circuit, a readout instrument adapted to yield digital values from the electrical signals put out by the sensor of FIG. 3.

Reference to FIG. 6 of the drawings discloses one circuit which may be employed to utilize the information given by the potentiometer changes to determine the terminal location of a prospect hole 16.

In FIG. 6, the reference numerals 100, 102, 104 and 106 denote the potentiometers 46, 50, 54 and 56 of FIGS. 3 and 4, and are here assigned different numerals for purposes of schematic illustration. The wires leading from these potentiometers are contained in the cable 40 of FIG. 3. The numeral 108 schematically denotes a dial face graduated in degrees from 0 to 360 fastened to the shaft of associated potentiometer 110 adapted to be rotated to give a reading in degrees. The numeral 112 denotes a polarity sensitive relay whose movable contact 113 closes one circuit used to energize a light 114 which indicates too little resistance in the read out circuit in the case that the dial 108 and hence the potentiometer shaft has been turned too far to the left. Another light 116 comes illuminated when the dial 108 has been turned too far to the right thus adding too much resistance in the readout sensing circuit. The numeral 118, together with its associated but unnumbered diodes, resistances, and capacitors designates an amplifying circuit which amplifies very low voltages when the circuit is near null or balanced, so that changes in the lights 114 and 116 will occur with a sensitivity within one-half a degree on the dial 108. In general, the sensing circuit is of the null balance type and when a null condition is obtained, the reading on dial 108 corresponds to the angular position of one of the selected potentiometers in the probe 24 of FIG. 3.

The numerals 120, 122, 124, 126 and 128 represent adjustable resistances which are used to calibrate and balance the individual sensing circuits. The numeral 130 denotes a switch to select the particular potentiometer 100 to 106 whose angular position will be found by rotation of the dial face 108. The numerals 132, 134 and 136 denote batteries and the numeral 138 denotes a battery test meter. The remaining unnumbered diodes, capacitors and resistances are employed to stabilize, to amplify and to filter the various electrical voltages. Inasmuch as the circuit illustrated in FIG. 6 is given by way of example only, as representing one null type balance circuit which may be employed, further detailed description of the circuit will not be offered. In use, the various potentiometers within the sensor 24 of FIG. 3 may be read by circuits such as shown in FIG. 6 during the insertion and movement of the assembly shown at FIG. 3 into the prospect hole 16 to thereby determine, as earlier discussed, the direction and hence the final position of the terminal portion of any prospect hole. This illustration of the principles of this invention has used rotary potentiometers for determining the angular and special orientation of the sensor assembly 24. Other transducers such as rotary linear variable differential transformers may be employed in this configuration and with the use of pendulums and levers to give linear movement proportional to the angular and deflection aspects of the sensor 24, both rectilinear potentiometers and rectilinear variable differential transformers are suitable.

I claim:

1. A probe assembly for determining the direction and extent of a bore in the earth including:
    a. a guided sensing device adapted to pass through a bore hole in the earth, said sensing device having a generally cylindrical casing;
    b. a rod, coaxial of said sensing device, and positioned and carried at one end thereof, to thereby define with said sensing device two coaxial members bendable with respect to each other;
    c. said rod carrying a deflection shaft, one end of which extends into the adjacent end of the sensing device;
    d. a deflection transducer carried within said sensing device, said transducer having an actuating arm, said arm being in abutting contact with and actuated by said deflection shaft; and
    e. a pair of pendulums carried within said sensing device, each of which is coupled to and actuates its own separate transducer, the axes of rotation of said pendulum being mutually perpendicular, each transducer being fixed relative to and carried within said sensing device, whereby changes in orientation of the sensing device cause movement of the pendulums relative to their associated transducers to thereby actuate them.

2. The probe assembly of claim 1 including:
    a. a second deflection transducer carried within said sensing device, said second deflection transducer having an actuating arm, said second actuating arm being in contact with and actuated by said deflection shaft; and
    b. the axes of rotation of said two deflection transducer actuating arms being noncoaxial.

3. The probe assembly of claim 2 wherein said deflection shaft is positioned between said two deflection transducer actuating arms.

4. A probe assembly for determining the direction and extent of a bore in the earth including a guided sensing device, a rod extending into one end of said sensing device, guide means carried by said rod, said sensing device carrying a transducer actuable by a rotation, means coupling the transducer to said rod, said transducer continuously responsive to changes in orientation of said rod with respect to said sensing device, said sensing device and rod adapted to continuously travel through a bore in the earth, one end of said rod being rigidly carried by said guide means, the other end of the rod extending into said sensing device, said guide means and said sensing device being joined by an elongated rubber tube through which said rod extends.

5. A probe assembly for determining the direction and extent of a bore in the earth including a guided sensing device, a rod extending into one end of said sensing device, guide means carried by said rod, said sensing device carrying a transducer actuable by a rotation, means coupling the transducer to said rod, said transducer continuously responsive to changes in orientation of said rod with respect to said sensing device, said sensing device and rod adapted to continuously travel through a bore in the earth, said means coupling the rod to the transducer being an arm having one end rotatably mounted in the transducer, one end of said rod being rigidly carried by said guide means, the other end of the rod extending into said sensing device, said guide means and said sensing device being joined by an elongated rubber tube through which said rod extends.

6. A probe assembly for determining the direction and extent of a bore in the earth including a guided sensing device, a rod extending into one end of said sensing device, guide means carried by said rod, said sensing device carrying two transducers, a rotatable arm carried by and actuating each transducer, said arms each movable by said rod, the axes of rotation of said arms being noncoaxial said sensing device and rod adapted to continuously travel through a bore in the earth, one end of said rod being rigidly carried by said guide means, the other end of the rod extending into said sensing device, said guide means and said sensing device being joined by an elongated rubber tube through which said rod extends.